United States Patent [19]

Campbell

[11] 4,369,282

[45] Jan. 18, 1983

[54] MODIFIED POLYESTER COMPOSITIONS

[75] Inventor: Richard W. Campbell, Evansville, Ind.

[73] Assignee: General Electric Company, Pittsfield, Mass.

[21] Appl. No.: 218,396

[22] Filed: Dec. 19, 1980

Related U.S. Application Data

[62] Division of Ser. No. 54,403, Jul. 3, 1979, Pat. No. 4,267,286.

[51] Int. Cl.$^3$ .............................................. C08L 67/02
[52] U.S. Cl. ................................. 524/445; 524/505; 524/513; 524/604; 524/845
[58] Field of Search ............... 525/176, 63, 64, 92, 525/93, 173, 177; 524/445, 505, 513, 604, 845

[56] References Cited

U.S. PATENT DOCUMENTS

| | | | |
|---|---|---|---|
| 2,465,319 | 3/1949 | Whinfield et al. | 260/75 |
| 3,047,539 | 7/1962 | Pengilly | 260/75 |
| 3,591,659 | 7/1971 | Brinkmann | 260/873 |
| 3,833,685 | 9/1974 | Wambach | 260/860 |
| 3,855,277 | 12/1974 | Fox | 260/45.7 R |
| 3,953,394 | 4/1976 | Fox | 260/40 R |
| 3,953,404 | 4/1976 | Borman | 260/75 M |
| 4,022,748 | 5/1977 | Schlichting et al. | 260/40 R |
| 4,034,013 | 7/1977 | Lane | 260/835 |
| 4,034,016 | 7/1977 | Baron et al. | 260/858 |
| 4,044,073 | 8/1977 | Baron et al. | 260/860 |
| 4,090,996 | 5/1978 | Gergen et al. | 260/40 R |
| 4,096,202 | 6/1978 | Farnham et al. | 260/873 |
| 4,267,286 | 5/1981 | Campbell | 525/176 |

*Primary Examiner*—Harold D. Anderson
*Attorney, Agent, or Firm*—Hedman, Casella, Gibson & Costigan

[57] ABSTRACT

Modified thermoplastic polyester compositions are provided which comprise (a) a poly(1,4-butylene terephthalate) resin or polyester copolymer and, optionally, a poly(ethylene terephthalate) resin and (b) a modifier therefor comprising a combination of a polyacrylate resin or a vinyl aromatic-diene block copolymer resin and a poly(1,3-butylene terephthalate), and, optionally (c) filler and/or reinforcing agent and/or (d) a flame retardant or combination of flame retardants. Modifier (b) provides enhanced resistance to impact fracture in articles molded from the compositions.

8 Claims, No Drawings

MODIFIED POLYESTER COMPOSITIONS

This is a division, of application Ser. No. 54,403 filed July 3, 1979, now U.S. Pat. No. 4,267,286.

This invention relates to modified thermoplastic polyester compositions which are moldable articles of improved impact strength. More particularly, the invention pertains to compositions of (a) a poly(1,4-butylene terephthalate)resin or a polyester copolymer resin and, optionally, a poly(ethylene terephthalate)resin which are modified with (b) an effective amount of a resinous combination comprising a polyacrylate or a vinyl aromatic-diene block copolymer and a poly(1,3-butylene terephthalate) and, optionally, (c) filler and/or reinforcing agent and/or (d) a flame retardant or a combination of flame retardants.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly (ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, alone or combined with reinforcements, in comparison with other thermoplastics, offer a high degree of surface hardness and abrasion resistance, high gloss, and lower surface friction.

Stable polyblends of poly(1,4-butylene terephthalate) and poly(ethylene terephthalate) can be molded into useful unreinforced and reinforced articles. See Fox and Wambach, U.S. Pat. No. 3,953,394, incorporated herein by reference.

Block copolyesters containing units derived from poly(1,4-butylene terephthalate) and from an aromatic-/aliphatic or aliphatic polyesters are also known. See, copending application U.S. Ser. No. 752,325, filed Dec. 20, 1976, incorporated herein by reference. Such block copolyesters are useful per se as molding resins and also in intimate combination with poly(1,4-butylene terephthalate) and/or poly(ethylene terephthalate).

It has been proposed to increase the impact strengths of polyesters by adding various modifiers. For example, Brinkmann et al in U.S. Pat. No. 3,591,659 disclose that a useful family of modifiers comprises polyalkyl acrylates, methacrylates and/or ethacrylates. Barron et al in U.S. Pat. No. 4,044,073 disclose that a useful impact modifier for such polyesters is an aromatic polycarbonate. Schlichting et al in U.S. Pat. No. 4,022,748 disclose that a rubber-elastic graft copolymer having a glass temperature below −20° C. is a useful modifier. Lane, U.S. Pat. No. 4,034,013, and Farnham et al, U.S. Pat. No. 4,096,202 disclose that useful impact modifiers comprise multiple stage polymers having a rubbery first stage and a hard final stage, preferably including units derived from alkyl acrylates, especially butyl acrylates. Baron et al in U.S. Pat. No. 4,034,016 (corres. German Pat. No. 2650870) disclose an impact modifier combination comprising a blend of a polyurethane and an aromatic polycarbonate. Copending application Ser. No. 957,801, filed Nov. 6, 1978, now Pat. No. 4,257,937, discloses an impact modifier combination comprising a poly(alkyl acrylate) and an aromatic polycarbonate. Gergen et al., U.S. Pat. No. 4,090,996 disclose an impact modifier combination comprising a vinyl aromatic-diene copolymer in combination with a "dissimilar engineering thermoplastic." All of the foregoing patents and the application are incorporated herein by reference. Filled reinforced and/or flame retardant modifications of such polyesters are also well known in the art.

It has now been discovered that such polyesters can be greatly improved in impact strength by intimately admixing therewith an impact improving modifier combination comprising a polyacrylate resin or a vinyl aromatic-diene copolymer and a poly(1,3-butylene terephthalate)resin. The latter is not an engineering thermoplastic in the sense used in the above-mentioned Gergen et al. patent.

As will also be shown, the new compositions of this invention can be reinforced, filled, reinforced and filled, and all modifications can be rendered flame-retardant.

DESCRIPTION OF THE INVENTION

According to this invention, there are provided thermoplastic compositions which are useful for molding, e.g., injection molding, compression molding, transfer molding, and the like, the compositions comprising:

(a) a polyester comprising:
  (i) a poly(1,4-butylene terephthalate) resin;
  (ii) a blend of a poly(1,4-butylene terephthalate) resin and a poly(ethylene terephthalate) resin;
  (iii) a block copolyester of poly(1,4-butylene terephthalate) and an aromatic/aliphatic or aliphatic polyester;
  (iv) a blend of (iii) and a poly(ethylene terephthalate) resin; or
  (v) a blend of (iii) and a poly(1,4-butylene terephthalate) resin; and
(b) an impact modifier therefor comprising a combination of:
  (i) a polyacrylate resin or a vinyl aromatic-diene block copolymer resin and
  (ii) a poly(1,3-butylene terephthalate)resin, in an amount of up to 60 parts per 100 parts by weight of (a) and (b) together.

The polyester resins (a) of the compositions of this invention are available commercially or can be prepared by known techniques such as by the alcoholysis of esters of terephthalic acid with ethylene glycol or butanediol and subsequent polymerization, by heating the glycols with the free acids or with halide derivatives thereof, and similar processes. These are described in U.S. Pat. Nos. 2,465,319, and 3,047,539, and elsewhere. As has been mentioned, preparation of the block copolyesters is described in Borman, Dolce and Kramer, U.S. Ser. No. 752,325, filed Dec. 20, 1976, and incorporated herein by reference.

Illustratively, the high molecular weight polyesters will have an intrinsic viscosity of at least about 0.6 deciliters/gram and preferably, at least 0.8 deciliters/gram as measured in a 60:40 phenol/tetrachloroethane mixture at 30° C.

Especially useful when high melt strength is important are branched high melt viscosity poly(1,4-butylene terephthalate) resins, which include a small amount of e.g., up to 5 mole percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol, triols, such as trimethylolpropane, or dihydroxy carboxylic acids and hydroxydicarboxylic acids and derivatives, such as 2,2-bis(hydroxymethyl)propionic acid, and the like.

The branched poly(1,4-butylene terephthalate)resins and their preparation are described in Borman, U.S. Pat. No. 3,953,404, incorporated herein by reference.

Impact modifier (b) comprises a combination of (i) a polyacrylate resin or a vinyl aromatic-diene block copolymer resin and (ii) a poly(1,3-butylene terephthalate). The polyacrylate resin (b)(i) can be made in known ways and they are available from a number of sources, e.g., Rohm & Haas Company, Philadelphia, U.S.A. under the trade designations Acryloid, KM330 and 7709XP. Other useful polyacrylates are available from Goodyear Tire & Rubber Co., Akron, Ohio U.S.A. under the trade designation RXL6886; from American Cyanamid Company, Stamford, Ct., U.S.A., under the trade designation Cyanacryl 770; from M & T Chemicals Co., Trenton, N.J., U.S.A., under the trade designation Durostrength 200; and from Polysar Corporation, Canada, under the trade designation Polysar S1006. In general, any of the polyalkyl acrylates described in Brinkmann et al., U.S. Pat. No. 3,591,659 can be used, especially those containing units derived from n-butyl acrylate. Preferably, the polyacrylate resin will be in the form of a rubber-elastic graft copolymer having a glass transition temperature below $-20°$ C. as described in Schlichting et al, U.S. Pat. No. 4,022,748. Especially preferably, the polyacrylate will comprise a multiple stage polymer having a rubbery first stage and a thermoplastic hard final stage, as described in Farnham et al, U.S. Pat. No. 4,096,202, incorporated herein by reference. The vinyl aromatic-diene block copolymers are described in the above-identified Gergen patent, especially the preferred selectively hydrogenated styrene-butadiene-styrene embodiments. They are commercially available, e.g., from Shell Chemical Co., product designation Kraton G-1651. The poly(1,3-butylene terephthalate)resins (b)(ii) can be made in known ways, by the procedures outlines above for (a), but substituting a 1,3-butylene glycol or reactive derivative thereof. In general, any of the isomeric 1,3-butylene glycols can be employed, but it is preferred to have the units derived from the 1,3-butylene glycol isomer also known as 2-methyl-1,3-propanediol.

In certain preferred features the composition will include fillers, especially reinforcing fillers such as fibrous (filamentous) glass or mineral fillers, such as clay, mica, talc and the like, preferably clay. The fillers can be untreated or treated with silane or titanate coupling agents, etc. The filamentous glass to be employed as reinforcement in such embodiments of the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0005 to 0.250 inch.

The amount of the filler can vary widely depending on the formulation and needs of the particular composition, it being essential only that an amount is selected which is at least sufficient to provide reinforcement. Preferably, however, the reinforcing filler will comprise from about 1 to about 60% by weight of filler (c) and (a) and (b), combined.

It has also been discovered that the polyester compositions of this invention which contain modifiers and fibrous glass exhibit improved impact and flexural properties when the glass is predispersed in the resin.

It has further been found that even relatively minor amounts of the modifier (b) are effective in providing significant improvements in impact strength, and the like. In general, however, the modifier (b) will be present in amounts of at least about 1% by weight, preferably from about 2.5 to about 50% by weight of (a) and (b). The ratio of polyacrylate or vinyl aromatic-diene block copolymer to poly(1,3-butylene terephthalate) can vary widely, i.e., within the range of 1 to 99 parts of the former to, correspondingly, 99 to 1 parts of the latter, but in general, from 60 to 10 parts of the polyacrylate or vinyl aromatic-diene block copolymer will be present for each 10 to 60 parts of the poly(1,3-butylene terephthalate) per 100 parts by weight of (b).

The impact modified polyesters, alone, or in combination with a filler can be rendered flame retardant with an effective amount of a conventional flame retardant agent (d). As is well known, flame retardants can be based on elementary red phosphorus, phosphorus compounds, halogen and nitrogen compounds alone or preferably in further combination with synergists, such as antimony compounds. Especially useful are polymeric and oligomeric flame retardant agents comprising tetrabromobisphenol-A carbonate units, see, for example, Wambach, U.S. Pat. Nos. 3,833,685, and Fox, 3,855,277, which are incorporated herein by reference.

Other ingredients, such as dyes, pigments, drip retardants, and the like can be added for their conventionally employed purposes.

The compositions of this invention can be prepared by a number of procedures. In one way, the modifier and any reinforcement, e.g., glass fibers, and/or non-reinforcing filler or fire retardants is put into an extrusion compounder with the resinous components to produce molding pellets. The modifier, and filler and/or reinforcement, if any, is dispersed in a matrix of the resin in the process. In another procedure, the modifier is mixed with the resins by dry blending, then either fluxed on a mill and comminuted, or then are extruded and chopped. The modifying agent can also be mixed with the resins and directly molded, e.g., by injection or transfer molding techniques.

It is always important to thoroughly free all of the ingredients; resin, modifier, reinforcement, filler, if used, and any optional, conventional additives from as much water as possible.

In addition, compounding should be carried out to ensure that the residence time in the machine is short; the temperature is carefully controlled; the friction heat is utilized; and an intimate blend between the resin and the modifier is obtained.

Although it is not essential, best results are obtained if the ingredients are pre-compounded, pelletized and then molded. Pre-compounding can be carried out in conventional equipment. For example, after carefully pre-drying the polyester and modifier and the reinforcing agent, or filler, if used, e.g., for 4 hours at 250° F., a single screw extruder is fed with a dry blend of the ingredients, the screw employed having a long transition section to ensure proper melting. On the other hand, a twin screw extrusion machine, e.g., a 53 mm Werner Pfleiderer machine can be fed with resin and additives at the feed port and reinforcement down stream. In either case, a generally suitable machine temperature will be about 450° to 560° F.

The pre-compounded composition can be extruded and cut up into molding compounds such as conventional granules, pellets, etc., by standard techniques.

The composition can be molded in any equipment conventionally used for glass-filled thermoplastic compositions, e.g., a Van Dorn type injection molding machine with conventional cylinder temperatures, e.g., 450°–535° F. and conventional mold temperatures, e.g., 130°–200° F.

DESCRIPTION OF THE PREFERRED EMBODIMENTS

The following examples illustrate the invention. They are set forth as a further description but are not to be construed as limiting the invention thereto.

EXAMPLE 1

A dry blend of poly(1,4-butylene terephthalate) resin (PBT), acrylic rubber, poly(1,3-butylene terephthalate) and mold release/stabilizer is compounded and extruded at 500°–525° F. in an extruder. The extrudate is pelletized and injection molded (mold temperature 150° F.). For comparison purposes, blends are made omitting the poly(1,3-butylene terephthalate) on the one hand and substituting it as sole resinous component on the other. The formulations and physical properties are shown in Table 1.

TABLE 1

Compositions Comprising Polyesters, a Polyacrylate and Poly(1,3-butylene terephthalate)

| | Example | | | |
|---|---|---|---|---|
| | 1 | A* | B* | C* |
| Composition (parts by weight) | | | | |
| Poly(1,4-butylene terephthalate)[a] | 68.8 | 100 | 0 | 83.8 |
| Poly(1,3-butylene terephthalate)[b] | 15 | — | 100 | 0 |
| Polyacrylate rubber[c] | 15 | — | — | 15 |
| Mold release/stabilizer | | | | |

TABLE 1-continued

Compositions Comprising Polyesters, a Polyacrylate and Poly(1,3-butylene terephthalate)

| | Example | | | |
|---|---|---|---|---|
| | 1 | A* | B* | C* |
| (to make 100) | | | | |
| Properties | | | | |
| Distortion Temperature Under Load, °F., 264 psi | — | 130 | — | 126 |
| Tensile strength, psi | 5,600 | 7,500 | 6,995 | 6,050 |
| Modulus, psi | 260,000 | 340,000 | 331,600 | 340,000 |
| Notched Izod impact strength, ft.-lbs. ⅛" sample | 16 | 1.0 | 0.7 | 2.9 |
| Unnotched Izod impact strength, ft.-lbs. ⅛" sample | N/B** | N/B** | 29 | N/B** |

*Comparison
[a]VALOX 315, General Electric Co.
[b]From 2-methyl-1,3-propanediol
[c]ACRYLOID 7709-XP Rohm & Haas Co.
**N/B—no break using 10 lbs. hammer The unexpected improvement in impact strength of Example 1 (⅛" notched Izod) is clearly evident.

EXAMPLE 2

The general procedure of Example 1 is repeated substituting a selectively hydrogenated styrene-butadiene-styrene block copolymer resin for the polyacrylate and adding a mineral filler, clay. The formulations used and the results obtained are set forth in Table 2:

TABLE 2

Compositions Comprising Polyester, A Styrene-Butadiene Block Copolymer and Poly(1,3-butylene terephthalate)

| | Example | |
|---|---|---|
| | 2 | 2A* |
| Composition (parts by weight) | | |
| Poly(1,4-butylene terephthalate)[a] | 47.3 | 69.8 |
| Poly(1,3-butylene terephthalate)[b] | 15 | 0 |
| SEBS Rubber [c] | 07.5 | 0 |
| Clay[d] | 30 | 30 |
| Stabilizers (to make 100) | 0.2 | 0.2 |
| Properties | | |
| Notched Izod Impact, ft.-lbs./in. at ⅛" sample | 1.54 | 1.1 |
| Unnotched Izod Impact, ft.-lbs./in at ⅛" sample | N/B** | 31 |
| Flexural Modulus, psi | 497,000 | 598,800 |
| Tensile Strength, psi | 6,613 | 9,020 |
| Distortion Temperature Under Load, °F., 264 psi | 131 | 180 |
| Gardner Impact Strength, in. lbs. | 400 | 250 |

*Control
[a]Valox 315, General Electric Co.
[b]From 2-methyl-1,3-propane diol
[c]Partially hydrogenated SBS Rubber - Kraton G-1651, Shell
[d]Calcined clay, average particle size ca 1.2 microns, surface treated with γ-aminopropyl triethoxy silane (A-1100, Union Carbide). Treated clay sold as Translink 445 by Freeport Kaolin.
**No break using 10 lbs. hammer.

The increase in impact strength is clearly shown.

Obviously, other modifications and variations of the present invention are possible in the light of the above teachings. For example, reinforced and/or filled compositions can be prepared, and these can be rendered flame retardant, and the poly(1,4-butylene terephthalate) can be replaced with copolyester or, in part, with poly(ethylene terephthalate). It is therefore, to be understood that changes may be made in the particular embodiments described above which are within the scope of the invention as defined in the appended claims.

I claim:

1. A thermoplastic composition comprising:

(a) a polyester composition comprising:
  (i) a poly(1,4-butylene terephthalate) resin;
  (ii) a blend of a poly(1,4-butylene terephthalate resin and a poly(ethylene terephthalate) resin;
  (iii) a block copolyester of poly(1,4-butylene terephthalate) and an aromatic/aliphatic or aliphatic polyester;
  (iv) a blend of (iii) and a poly(ethylene terephthalate) resin; or
  (v) a blend of (iii) and a poly(1,4-butylene terephthalate) resin;
(b) an impact modifier therefor comprising a combination of:
  (i) a polyacrylate resin or a vinyl aromaticdiene block copolymer resin; and
  (ii) a poly(1,3-butylene terephthalate) resin, in an amount of up to 60 parts per 100 parts by weight of (a) and (b) together; and
(c) a component selected from the group consisting essentially of fillers, reinforcing agents and mixtures of the two, said component being present in an amount of from about 1 to about 60 parts by weight per 100 parts by weight of (a), (b) and (c) together.

2. A thermoplastic composition as defined in claim 1 wherein component (c) comprises (c)(i) fibrous glass.

3. A thermoplastic composition as defined in claim 2 wherein component (c)(i) comprises fibrous glass predispersed in said polyester component (a).

4. A composition as defined in claim 1 wherein component (c) comprises (ii) a mineral filler.

5. A composition as defined in claim 4 wherein component (c)(ii) comprises a clay.

6. A composition as defined in claim 1 which also includes (d) a flame-retardant amount of a flame retarding agent.

7. A composition as defined in claim 6 wherein component (c) comprises (i) fibrous glass.

8. A composition as defined in claim 6 wherein component (c) comprises (ii) a mineral filler.

* * * * *